United States Patent [19]

Kohen et al.

[11] Patent Number: 4,823,380
[45] Date of Patent: Apr. 18, 1989

[54] VOICE CHANGER

[75] Inventors: Chaim Kohen, 2108 Cypress Bend Dr., Apt. 208 B-10, Pompano Beach, Fla. 33069; Itzhak Berliner, Ramat-Gan, Israel

[73] Assignee: Chaim Kohen, Pompano Beach, Fla.

[21] Appl. No.: 30,624

[22] Filed: Mar. 27, 1987

[51] Int. Cl.⁴ .................. H04M 1/00; H03G 3/00; G06F 3/16
[52] U.S. Cl. .................................. 379/387; 380/9; 381/61; 381/36
[58] Field of Search .............. 379/387; 380/9; 381/61, 381/54, 36, 37, 42, 110

[56] References Cited

U.S. PATENT DOCUMENTS

| | | | |
|---|---|---|---|
| 3,234,333 | 2/1966 | Guder | 279/87 |
| 3,681,756 | 8/1972 | Burkhard et al. | 381/36 |
| 4,160,122 | 7/1979 | Jacobson | 179/1 A |
| 4,191,861 | 3/1980 | Walker, Jr. | 179/81 B |
| 4,367,374 | 1/1983 | Serrano | 179/2 C |
| 4,683,588 | 7/1987 | Goldberg | 381/61 |

Primary Examiner—Stafford D. Schreyer
Attorney, Agent, or Firm—Barnes & Thornburg

[57] ABSTRACT

A voice changer for use generally with a telephone includes a first port for receiving signals from a microphone or the hand set, a second port for connection to a microphone or a telphone set, and a voice changer circuit for selectively changing the frequency content of voice signals transmitted between the first and second ports. The clocking frequency of analog to digital and digital to analog converters connected to a continuously operating real-tim CPU varies the frequency content of the voice signal to provide masking of voices, for example changing a male to a female voice or a female to a male voice.

23 Claims, 1 Drawing Sheet

VOICE CHANGER

BACKGROUND AND SUMMARY OF THE INVENTION

The present invention relates generally to voice changers and more specifically to a unique voice changer for use with a telephone.

There are many situations in which a person does not wish their voice to be recognized. Historically, devices have been attached to the mouthpiece of the hand set of a telephone to alter the voice being picked up by the microphone in the hand set. This is generally a physical modification of the voice signal. These devices typically produce a muffled voice and have not generally changed the frequency content. Thus, one could still generally identify the speaker as male or female.

At least one digital voice changer is available. This is a hand held unit into which one speaks and has an output device which is mounted over the mouth piece of a telephone handset.

Women living alone generally use only the initial of their first name in telephone listings and mail boxes for personal security. An unknown caller could detect the sex of the answerer and thus defeat the purpose of the telephone listing. Also, in front door security intercoms, the occupant would reveal their sex by answering on the intercom.

There has been a substantial amount of research in analyzing voice signals for speech synthesizers as well as controlling other devices by recognition of speech commands. Depending upon the controls to be operated, the amount of words which must be recognized is determined. For general controls, for example, UP-DOWN, RIGHT-LEFT or ON-OFF, the recognition of a substantial number of different kinds of voices for these commands can be recognized. As the amount of words to be recognized increases, the memory required, as well as the sophistication of the circuit, and the ability to recognize different speakers saying those same words, becomes substantially more difficult. An example of such a sophisticated system is a typewriter or word processing unit which is voice actuated. Most recently, these systems are produced and then tailored for the individual operator. This would not allow another operator to use the same terminal. This restricts their use and increases, unnecessarily, the cost of the unit or requires more units, one for each operator.

There has been much research conducted on speech synthesizers which break speech into multiple components, store them in a digital computer, and reproduces specific messages as required. These have been included in household appliances, automobiles and other consumer devices. Small integrated circuits have been developed which will convert an 8-bit I/O data port into a high quality speech port. This is done for example, using a continuously variable slope-delta modulation to encode and decode wave forms under the direction of a microprocessor. Such a chip is available from Motorola as MC-3518. By changing the time constant elements of the circuit including data rate, a change in the frequency range of the encoder occurs. Historically, the frequency range has been changed to improve the quality and match the voice of the speaker or to minimize the storage at the cost of voice quality.

It is an object of the present invention to provide an electronic voice changer for real-time use.

Another object of the present invention is to provide a voice changer which is connected between the hand set and the telephone set.

A still further object of the present invention is to provide an inexpensive voice changer which may be easily inserted between the hand set and the telephone set.

A still further object of the present invention is to provide a real-time voice changer which allows selectible varying of the frequency content of the voice signal such that the sex of the voice has been changed.

A still further object is to provide a voice changer which provides security by changing the apparent sex of the speaker on a telephone or intercom.

An even further object of the present invention is to provide a voice changer for use with voice actuated controls to make them more universal.

These and other objects are achieved by providing a voice changing having a first port for connection to a microphone, a second port connectible to a speaker, and a voice changing circuit for selectively changing the frequency content of the voice signal transmitted between the first and second ports. The voice changing circuit includes selection capability for selecting either (1) no voice change; (2) a high frequency change; or (3) a low frequency change. The frequency change may change a male to a female voice or a female to a male voice or any variation in between.

The voice changer uses analog to digital converter connecting the first port to a microprocessor through a serial to parallel converter wherein the digitized voice signals are stored and played back through a parallel to serial converter and a digital to analog converter whose output is connected to the second port. Clock circuits drive these elements in real-time. By varying the frequency of the clock pulses, the frequency content of the encoded and decoded speech is varied. The clock which drives the analog to digital converter and serial to parallel converter is driven at a fixed rate, and a second clock that drives the parallel to serial converter and the digital to analog converter is a variable clocks.

When the voice changer is used with a telephone, the first port is connected to the hand set or speaker, and the second port is connected to the telephone. The microphone signals are processed by the voice changer and the speaker signals are connected directly between the first and second ports without a modification. Depending upon the signals, an input amplifier may be required and an output amplifier and interface circuit, for example a transformer, may be required.

The voice changer may also be used on an intercom to change the occupant's voice from that of a woman to a man and thereby providing security as well as mask the identity. Another environment for the voice changer is its use in a voice control environment. With word processors or automatic typewriters, the voice changer could be connected between the microphone and the analysis unit. By adjusting the voice changer, all incoming voices, even though they vary in frequency, will be in a defined frequency range.

Other objects, advantages and novel features of the present invention will become apparent from the following detailed description of the invention when considered in conjunction with the accompanying drawings.

DETAILED DESCRIPTION OF THE DRAWINGS

Figure 1:
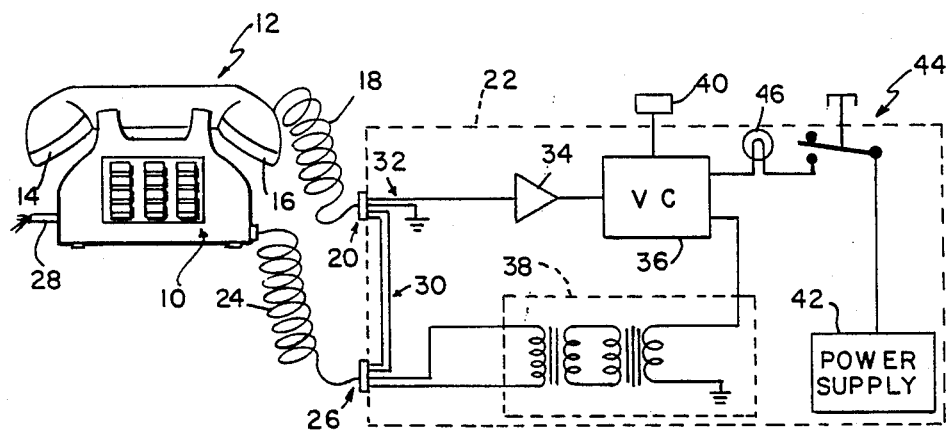
FIG. 1 is a block diagram of a voice changer incorporating the principles of the present invention used with a telephone.

A telephone, as illustrated in FIG. 1, includes a telephone set 10 and a hand set 12. The hand set 12 includes a speaker 14 and a microphone 16. The hand set 12 is connected by a cord 18 to a first port 20 of the voice changer 22. The telephone set 10 is connected by wire 24 to a second port 26 of the voice changer 22 and is connected to the telephone lines by wire 28. The wires 18 and 24 are standard four-wire set, carrying two wires for the speaker 14 and two wires for the microphone 16. Since the voice changer is designed only to change the signal received from microphone 16, connections 30 interconnect the two wires of the speaker between ports 20 and 26 without signal modification. The two microphone wires of the first port 20 are provided by 32 to ground and an amplifier 34. The amplified signal is provided to a voice changing circuit 36 whose output is connected to an interface circuit 38 which is shown as a pair of transformers. The output of the transformers is provided to the two microphone terminals at the second port 26.

The frequency content of the voice signal received from the speaker may be varied by control 40 connected to the voice changer circuit 36. At its center position, no change of the frequency content of the voice is produced. When knob 40 is turned in one direction, the frequency content of higher frequency increases, providing a more female-sounding voice. When turned in the other direction, the frequency content of lower frequency increases, thereby increasing the male content of the voice. Thus, the voice changer can change the apparent sex of the voice, or merely mask the voice of a given sex by altering its frequency.

Voice changer 22 includes a power source 42 which may be, for example, a 9-volt battery connected to the voice changer circuit 36 by on-off switch 44 and a lamp 46. The lamp indicates that the voice changer 22 is on.

Figure 2:
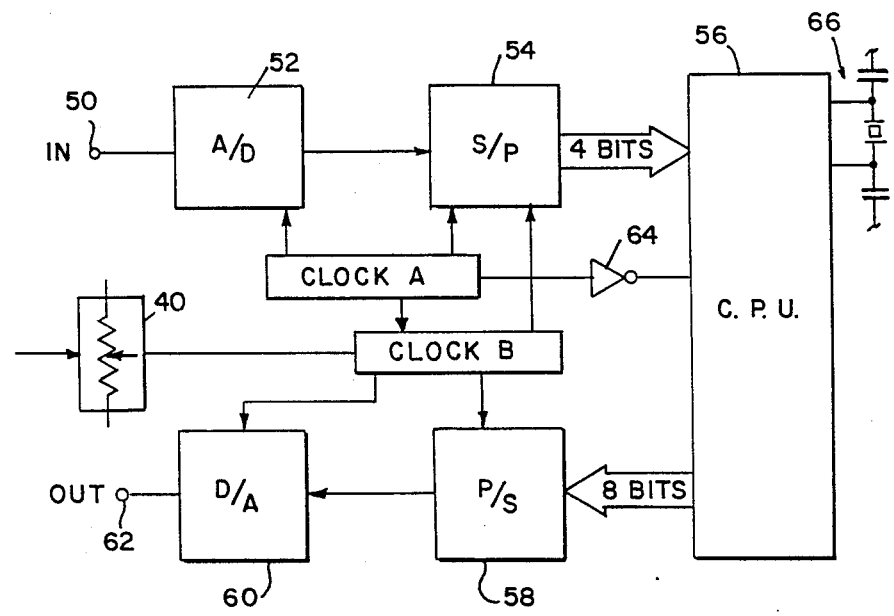
FIG. 2 is a block diagram of a voice changer incorporating the principles of the present invention.

The voice changer circuit 36 is illustrated in detail in FIG. 2. The input 50 is provided to an analog to digital converter 52 which is connected to CPU 56 by a serial to parallel converter 54. The analog voice input signal is received in series and converter to a four line parallel input to the CPU. The parallel 8-bit output of CPU 56 is provided to a digital to analog converter 60 by parallel to serial converter 58. The analog signal from digital to analog converter 60 is provided on output 62.

A clock is shown as including clock A and clock B. Clock A is connected to the analog to digital converter 52 and the serial to parallel converter 54. Clock B is shown connected to the digital to analog converter 60 and the parallel to serial converter 58. As an option, clock B may also be connected to serial to parallel converter 54. Clock A is also connected to the CPU 56 by an inverter 64. An oscillator 66, for example ten megahertz, is also connected to the CPU 56. The manual selection control 40 of the voice changer circuit 36 is shown as a variable resister which controls the frequency of clock B. Clock A is fixed. The clocks may be independent oscillators or clock A can be an oscillator and clock B can be a variable counter. By varying the clock pulse rate of clock B from 0.5 to 2.0 times that of clock A, the frequency content of the input signal which is decoded by the analog to digital converter 52 and provided to the CPU 56 to be recalled almost instantaneously and decoded by digital to analog converter 60, is determined.

The voice changer 36 is intended to be used to intentionally distort the voice to mask the caller. This is opposite from the prior art purpose, which is to achieve as high a quality of reproduction of the input or stored voice signals, which are stored in the CPU memory until recalled. This is a real-time use of the voice changing circuitry and its elements.

Typical examples of integrated circuits may be used for the elements of FIG. 2 or as follows.

| Device | Part No. and Source |
|---|---|
| Analog to Digital Converter 52 | MC3518, Motorola |
| Serial to Parallel Converter 54 | MC4015, Motorola |
| CPU 56 | 8749H, Intel |
| Parallel to Serial Converter 58 | MC14021, Motorola |
| Digital to Analog Converter 60 | MC3518, Motorola |

These are typical examples of integrated circuits with elements available in the marketplace. With respect to the analog to digital converter 52 and the digital to analog converter 60, circuits designed to encode and decode analog speech signals are highly desirable for these elements.

If access is available to the microphone of a speaker phone, the voice changer 22 could be inserted between the microphone of the speaker phone and the telephone circuitry. Alternatively a recorder, for example a tape recorder, may be connected to the second port 26 to store masked signals. The tape recorder could be part of a telephone answering machine. The voice changer 22 is a real-time voice changer requiring a minimum amount of memory. If room permits, the voice changer 22 could be housed within the telephone set 10 and the on-off switch would switch the voice changer into and out of the microphone voice signal paths.

Although the voice changer 22 has been shown connected between a hand set and a telephone set, it is obvious that it may also be used to interconnect a microphone on the first port 20 and a speaker on the second port 26. For example, the voice changer 22 could be provided on one of the microphone of an intercom. Thus, an unknown person seeking entry into a building by using an intercom would not know that the occupant answering on the intercom is a woman. This would substantially increase personal security.

Another environment for the voice changer is its use in a voice control environment. With word processors or automatic typewriters, the voice changer could be connected between the microphone and the analysis unit. By adjusting the voice changer, all incoming voices, even though they vary in frequency, will be in a defined frequency range. By reducing the possible frequency of the voice input signal to the voice analyzing circuit of an automatic typewriter or word processor, more words would be recognized and require less analysis which further reduces the memory required to support such analysis. Such a voice changer can be built in to the system or be an add on. An adjustment plus some indication of when the input voice has been modified to a desired frequency range can be provided. Similarly, an automatic adaptation circuit may be provided, which controls the voice changer to bring the input voice into the desired frequency range by changing its frequency content.

The voice changer can also be provided in a radio between the receiver and the speaker. The received signals can be varied by the listener.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A telephone voice changer for connection between a hand set and a telephone set comprising:
   a first port means for connection to a hand set,
   a second port means for connection to a telephone set, and
   voice changing means for selectively changing the frequency content of voice signals transmitted between said first and second ports, and including
   an analog to digital converter means whose input is connected to said first port means;
   a digital to analog converter means whose output is connected to said second port means;
   a digital processor means having an input and an output for receiving, storing and sending signal from its input and to its output;
   a serial to parallel converter means connecting said analog to digital converter means to said digital processor means input; and
   a parallel to serial converter means connecting said digital processor means output to said digital to analog converter means.

2. A telephone voice changer according to claim 1, wherein: said first port means includes a first port for receiving signals from a microphone of said hand set and a second port for sending signals to a speaker in said hand set;
   said second port means includes a third port for sending signals to a microphone terminal of said telephone set and fourth port for receiving signals from a speaker terminal of said telephone set; and
   said voice changing means is connected between said first and third ports.

3. A telephone voice changer according to claim 2, including interconnect means for connecting said second and fourth ports without signal modifications.

4. A telephone voice changer according to claim 1, wherein said voice changing means includes selection means for selecting one of the following: no voice change, male to female voice change, or female to male voice change.

5. A telephone voice changer according to claim 1, wherein said voice changer means includes selection means for selecting one of the following: no voice change, high frequency change, or low frequency change.

6. A telephone voice changer according to claim 1, wherein said voice changing means includes clock means connected to said converter means for generating a selected frequency of clock pulse which determines said change of frequency content.

7. A telephone voice changer according to claim 6, wherein said clock means includes a first clock for driving said analog to digital converter means and a second variable clock for driving said digital to analog converter means.

8. A telephone voice changer according to claim 1, including an amplifier means connecting said first port means to said analog to digital converter means and a transformer connecting said digital to analog converter means to said second port means.

9. A telephone voice changer according to claim 1, wherein:
   said first port means includes a first port for receiving signals from a microphone of said hand set and a second port for sending signals to a speaker in said hand set;
   said second port means includes a third port for sending signals to a microphone terminal of said telephone set and fourth port for receiving signals from a speaker terminal of said telephone set; and
   said voice changing means is connected between said first and third ports.

10. A telephone voice changer according to claim 9, including inter connect means for connecting said second and fourth ports without signal modifications.

11. A telephone voice changer according to claim 1 wherein said analog to digital converter includes a speech encoder and said digital to analog converter means includes a speech decoder.

12. A telephone voice changer according to claim 1, wherein said first clock is connected to said analog to digital converter means and said serial to parallel converter means and said second clock is connected to said parallel to serial converter means and said digital to analog converter means.

13. A voice changer for connection between a microphone and a speaker comprising:
   a first port means for connection to a microphone,
   a second port means for connection to a speaker,
   voice changing means for selectively changing the frequency content of voice signals transmitted between said first and second ports, and
   wherein said voice changing means includes:
   an analog to digital converter means whose input is connected to said first port means:
   a digital to analog converter means whose output is connected to said second port means;
   a digital processor means having an input and an output for receiving, storing and sending signals from its input and to its output;
   a serial to parallel converter means connecting said analog to digital converter means to said digital processor means input; and
   a parallel to serial converter means connecting said digital processor means output to said digital to analog converter means.

14. A voice changer according to claim 13 including a first clock for driving said analog to digital converter means and a second variable clock for driving said digital to analog converter means at a selected frequency of clock pulses which determines said change of frequency content.

15. A voice changer according to claim 14, wherein said voice changing means includes selection means for selecting one of the following: no voice change, male to female voice change, or female to male voice change.

16. A voice changer according to claim 14, wherein said voice changer means includes selection means for selecting one of the following: no voice change, high frequency change, or low frequency change.

17. A voice changer according to claim 14, wherein said first clock is connected to said analog to digital converter means and said serial to parallel converter means and said second clock is connected to said parallel to serial converter means and said digital to analog converter means.

18. A voice changer comprising:
an input port and an output port;
an analog to digital converter means whose input is connected to said input port means;
a digital to analog converter means whose output is connected to said second port means;
digital processor means having an input and output for receiving, storing and sending signal from its input and to its output;
a serial to parallel converter means connecting said analog to digital converter means to said digital processor means input;
and a parallel to serial converter means connecting said digital processor means out to said digital to analog converter means.

19. A voice changer according to claim 18 including clock means connected to said analog to digital and digital to analog converter means for generating a selectable frequency of clock pules to determine the change of frequency content of signals received at said input port; said clock means including a first clock for driving said analog to digital converter means and a second variable clock for driving said digital to analog converter means.

20. A voice changer according to claim 19, wherein said first clock is connected to said serial to parallel converter and said second clock is connected to said parallel to serial converter.

21. An intercom system comprising:
a first station having a first microphone and a first speaker:
a second station having second microphone and a second speaker;
means interconnecting said first and second stations for transmitting voice signals therebetween;
voice changer means for selectively changing the frequency content of voice signals received at a first port means from said first microphone and transmitted at a second port means to said second speaker; and
wherein said voice changing means includes:
an analog to digital converter means whose input is connected to said first port means;
a digital to analog converter means whose output is connected to said second port means;
a digital processor means having an input and output for receiving, sorting and sending signals from its input and to its output;
a serial to parallel converter means connecting said analog to digital converter means input to said digital processor means; and
a parallel to serial converter means connecting said digital processor means output to said digital to analog converter means.

22. An intercom system according to claim 21 including a first clock for driving said analog to digital converter means and a second variable clock for driving said digital to analog converter means at a selected frequency of clock pulses which determines said change of frequency content.

23. An intercom system according to claim 22, wherein said first clock is connected to said analog to digital converter means and said serial to parallel converter means and said second clock is connected to said parallel to serial converter means and said digital to analog converter means.

* * * * *